(12) United States Patent
Denham

(10) Patent No.: US 6,966,342 B2
(45) Date of Patent: Nov. 22, 2005

(54) CLOSED END SEALING PLUG

(75) Inventor: Keith Denham, Welwyn (GB)

(73) Assignee: Textron Fastening Systems Limited (GB)

( * ) Notice: Subject to any disclaimer, the term of this patent is extended or adjusted under 35 U.S.C. 154(b) by 0 days.

(21) Appl. No.: 10/275,755

(22) PCT Filed: May 3, 2001

(86) PCT No.: PCT/GB01/01927

§ 371 (c)(1),
(2), (4) Date: May 20, 2003

(87) PCT Pub. No.: WO01/86190

PCT Pub. Date: Nov. 15, 2001

(65) Prior Publication Data

US 2003/0178793 A1 Sep. 25, 2003

(30) Foreign Application Priority Data

May 11, 2000 (GB) .............................................. 0011250

(51) Int. Cl.[7] .................................................. F16L 55/10
(52) U.S. Cl. .......................................... 138/89; 138/90
(58) Field of Search ..................................... 138/89, 90

(56) References Cited

U.S. PATENT DOCUMENTS

| | | | | | |
|---|---|---|---|---|---|
| 3,451,583 A | * | 6/1969 | Lee | ............................. | 220/233 |
| 3,525,365 A | * | 8/1970 | Boyle et al. | .................. | 138/89 |
| 4,091,841 A | * | 5/1978 | Beneker et al. | ............... | 138/89 |
| 5,944,057 A | * | 8/1999 | Pierce | ......................... | 138/89 |

FOREIGN PATENT DOCUMENTS

| | | | | |
|---|---|---|---|---|
| EP | 877193 A1 | * | 11/1998 | ........... F16L/55/12 |
| GB | 1249517 | | 10/1971 | |
| GB | 2314904 | | 1/1998 | |
| GB | 2325039 | | 11/1998 | |

* cited by examiner

Primary Examiner—Patrick Brinson
(74) Attorney, Agent, or Firm—Trexler, Bushnell, Giangiorgi, Blackstone & Marr, Ltd.

(57) ABSTRACT

A sealing plug for blind installation in a suitable hole thereby to plug and seal the hole, which sealing plug comprises a sleeve (1) having one end closed, a stem (2) having a head (4) at least part of which is radially enlarged with respect to the remainder of the stem, the stem head being within the sleeve and the stem protruding from the open end of the sleeve by passing through a part of the sleeve which has an internal cross-sectional dimension less than that of the stem head, the stem head having a shoulder (8), and there being an abutment of sleeve material against at least the radially outer part of the shoulder, the stem head being of a material which is harder than that of the sleeve and being formed with a weakened portion at a position intermediate the head and the part of the stem remote therefrom, whereby, when the sealing plug is inserted in a suitable hole, with the sleeve entirely within the hole, and increasing tension force is applied to the stem with respect to the sleeve, axial compression is applied by the shoulder to engage with the hole, and thereafter the stem breaks at the weakened portion (3) so that the head remains within the sleeve.

6 Claims, 6 Drawing Sheets

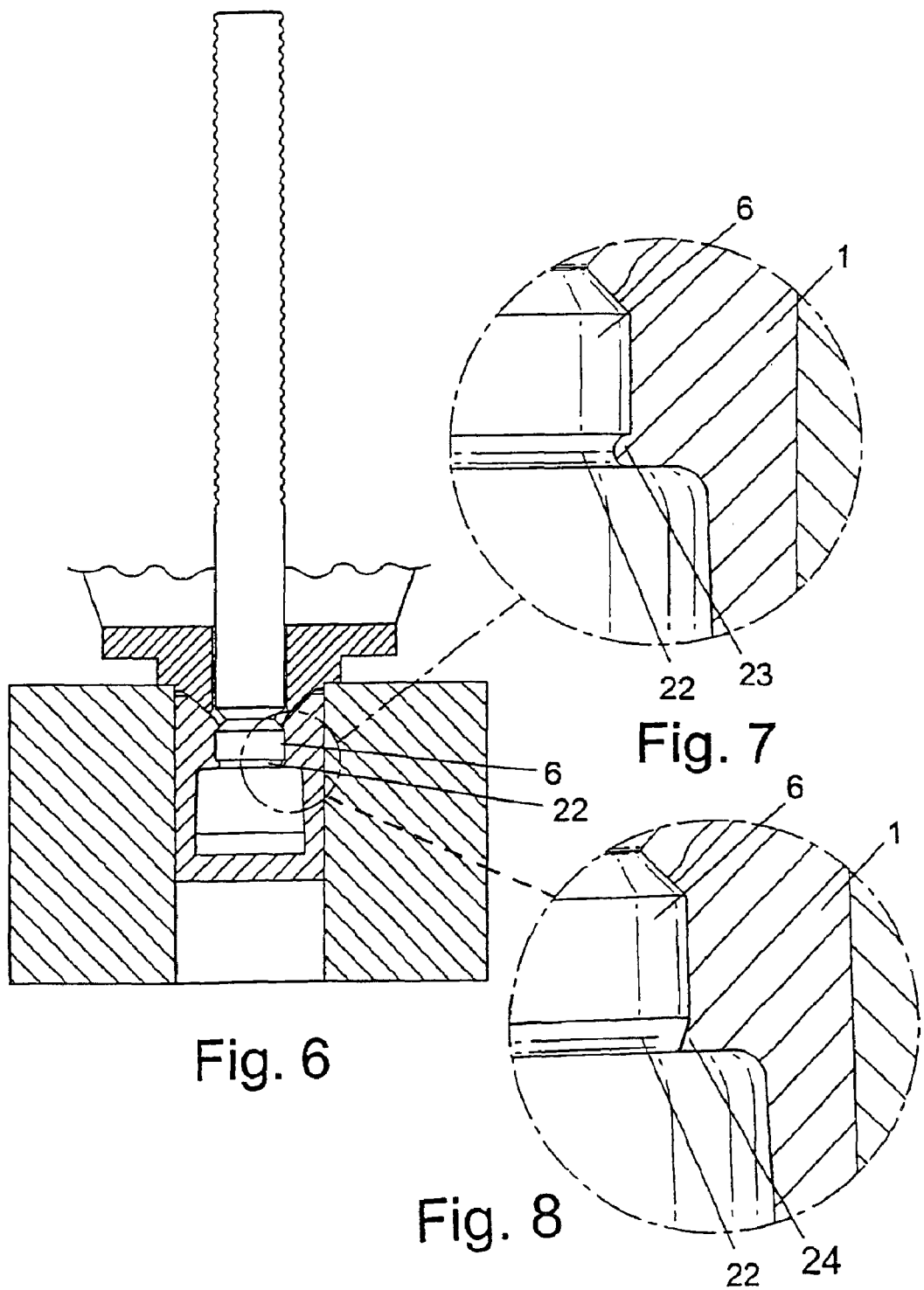

CLOSED END SEALING PLUG

RELATED/PRIORITY APPLICATIONS

Figure 1:
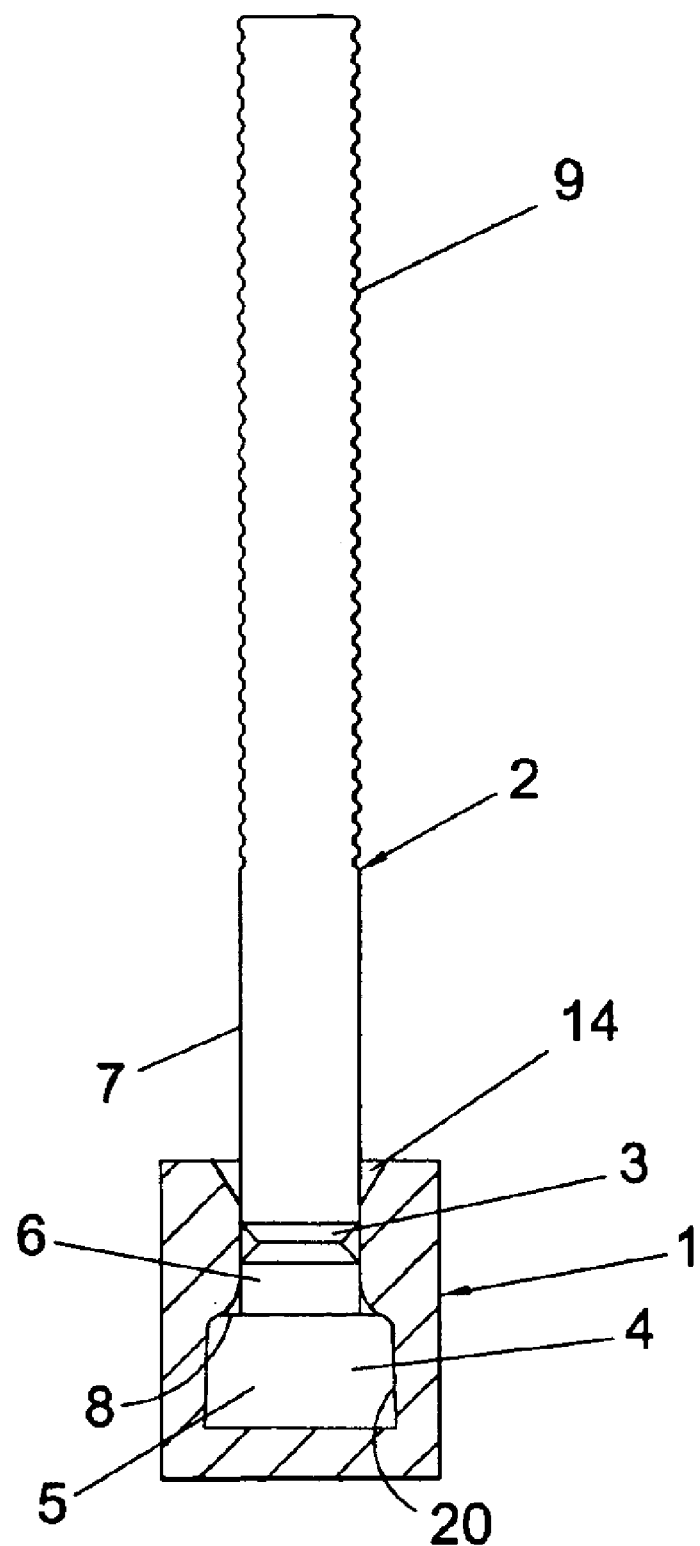

This application claims priority with respect to International Application No. PCT/GB01/01927, filed May 3, 2001, and British Application No. 0011250.8, filed May 11, 2000.

The invention relates to a closed end sealing plug for blind installation in a suitable hole thereby to plug and seal it, e.g. against high-pressure fluids. Blind installation means that the plug is installed by access through only one end of the hole.

Other types of sealing plug (e.g. those known under the trademarks AVSEAL and KOENIG HK) comprise a hollow cylindrical sleeve and a stem with a tapered head portion which is drawn into the sleeve causing it to expand radially until it fills the hole. The principal disadvantage of this type of plug is that the surface finish of the tapered head portion of the stem must be controlled to a high standard to avoid a potential leak path between the stem head and the sleeve. In order to ensure the high standard of surface finish is consistently achieved, the stem component is manufactured either by cold forging from wire which has a high quality surface finish, or else it is machined from bar so that the high quality surface finish is produced by the machining operation. Both of these methods have a cost penalty and it is desirable from a cost point of view to manufacture the stem by cold forging from wire which is not required to have special high quality surface finish.

One way of achieving this is to have a 'closed end' design whereby the sleeve component is in the shape of a can instead of a hollow cylinder. However, earlier designs of such closed end plugs, e.g. those shown in GB 2314904B and FR Application No 9908304, whilst satisfying the need not to use special quality wire for the stem, have two inherent shortcomings. Firstly, because the expansion of the sleeve is achieved by drawing the tapered stem head completely through and out of the bore of the sleeve, the length of the plug is necessarily long in order to maximise its retention force within the hole being plugged. Secondly, the stem tapered head is drawn completely through the reduced bore section of the sleeve and removed, and the whole stem is discarded; therefore, there is no remaining solid core to the installed plug. The effect of this is to allow a greater degree of elastic recovery of the expanded sleeve than would be the case if the stem head portion remained in the sleeve after installation, as is the case with the present invention. These earlier designs of plugs are known to have a reduced efficiency of plugging. In other words, sometimes the plugs leak at relatively low pressures and can even be forced out of engagement with the hole using relatively low pressures.

One object of the present invention is to provide a closed end plug which overcomes these deficiencies.

Accordingly, the present invention provides, in one of its aspects, a sealing plug as defined in claim 1.

Further preferred features of the invention are defined in claims 2 to 6.

A specific embodiment of the invention will be described by way of example and with reference to the accompanying drawings, which are sections through a sealing plug, the shell and part of an installation tool being shown in axial section and the stem being shown in elevation. In the drawings, FIG. 1 shows a plug before use, FIGS. 2 to 5 show successive stages in the installation of the plug, FIG. 6 is similar to FIG. 4 but shows a slightly modified form of plug, FIG. 7 is an enlargement of part of FIG. 6, and FIG. 8 is another enlargement of FIG. 6.

Referring to FIG. 1, the plug comprises a closed end sleeve 1 and a stem 2 which has a weakened portion in the form of breakneck 3. The stem head 4 has an enlarged portion 5 and a portion 6 intermediate the enlarged portion 5 and the breakneck 3, which is substantially the same diameter as the pulling portion 7 of the stem. The enlarged portion 5 has its circumferential face 20 slightly tapered, as shown. The transition between the enlarged portion 5 and the portion 6 is in the form of a shoulder 8. The circumferential surface of the enlarged portion 5 of the head is slightly tapered.

The open end of the sleeve 1 is formed with a relatively short internal chamfer 14.

The stem pulling portion 7 has conventional pulling grooves 9 for engagement with a conventional blind rivet installation tool.

The sleeve 1 is manufactured from relatively soft material such as aluminium, and the stem 2 is made from relatively hard material such as steel.

The sleeve 1 is assembled onto the stem 2 in such a way that there is an abutment of sleeve material against at least the radially outer part of the shoulder 8 on the stem head.

Figure 2:
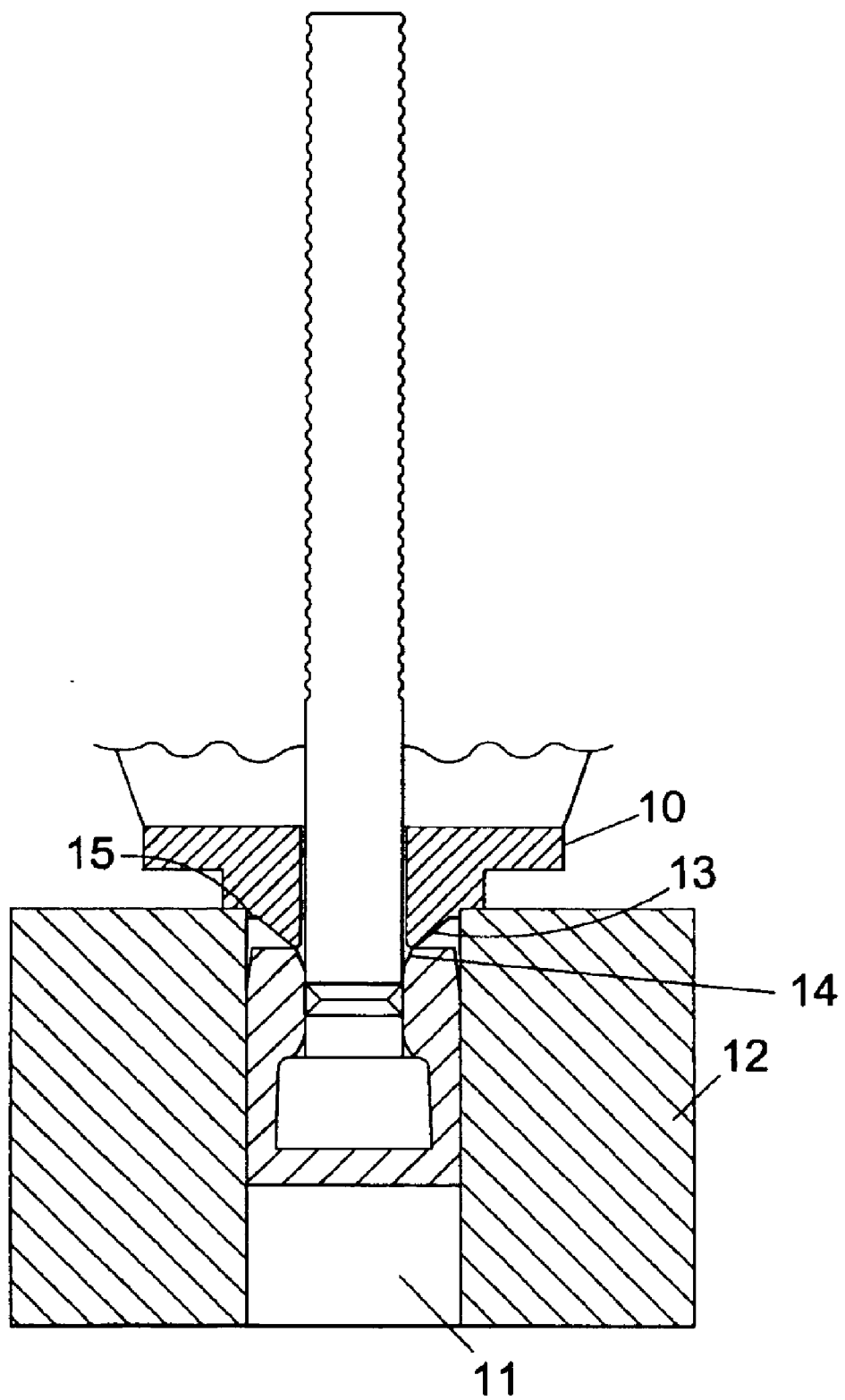

FIG. 2 shows the plug engaged in an installation tool of which the annular nosepiece 10 is the leading part, and inserted into the hole 11 of workpiece 12. The nosepiece has a conical projection 13, the leading edge of which is of a smaller diameter than the bore chamfer 14 of the sleeve 1. Nosetip 10 has a projecting boss 15 of appropriate diameter to fit within the hole 11, which has the effect of recessing the plug within the hole 11, so that the plug sleeve 1 is entirely within the hole 11, the length of the sleeve being less than the thickness of the workpiece 12.

The installation tool is of the type commonly used to install breakstem rivets or lockbolts. It includes pulling jaws (not shown) for gripping the protruding plug stem by engaging the pulling grooves 9, the jaws being retracted away from the tool nosepiece 10. The nosepiece reaction force is against the open end of the sleeve 1, so that an increasing tension force is applied to the stem 2 with respect to the sleeve 1.

Figure 3:
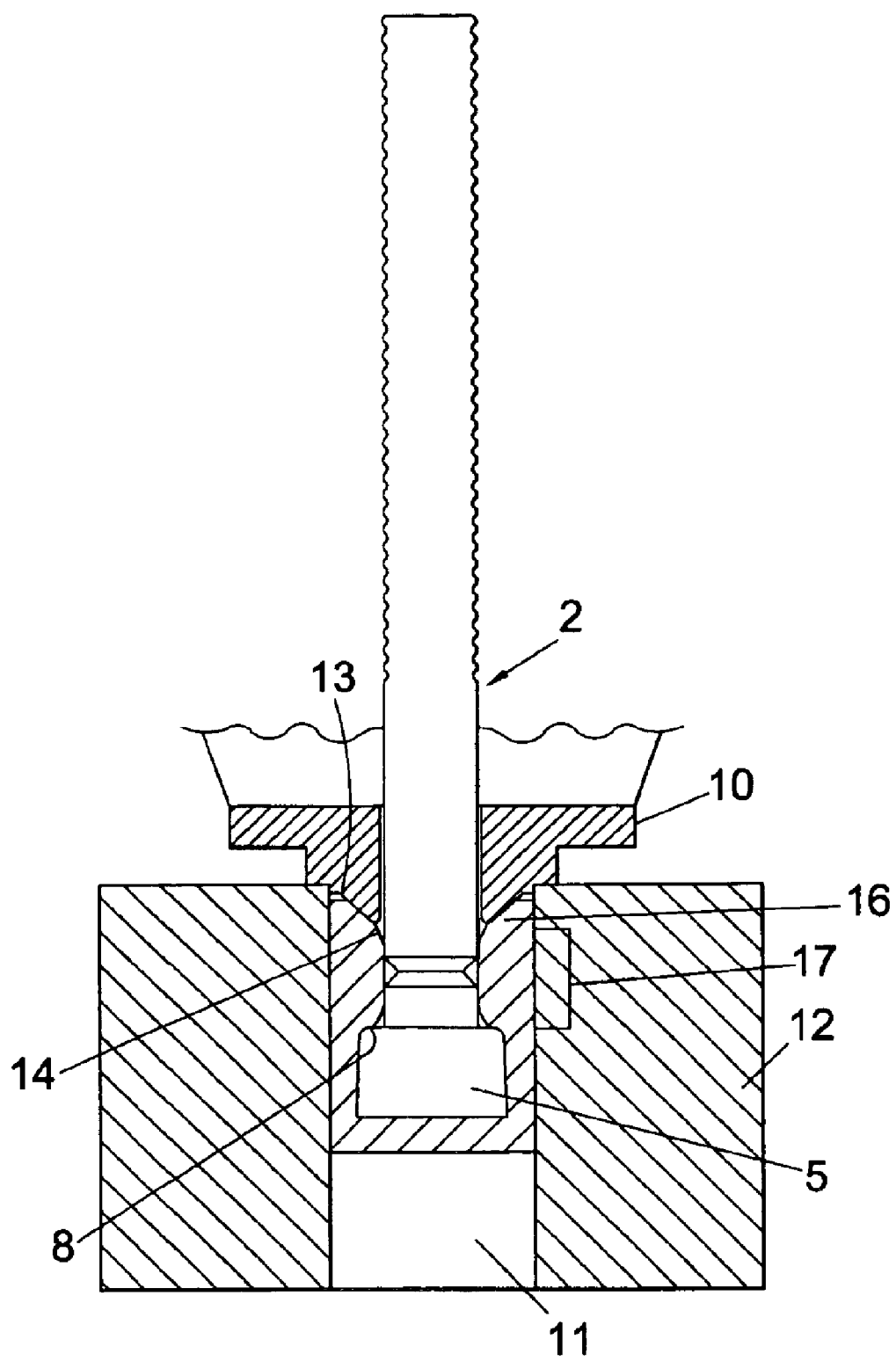

Thus, referring to FIG. 3, when the tool is operated, the stem 2 is drawn into nosepiece 10 and thus the stem head enlarged portion 5 is drawn towards the tool nosepiece 10. The initial effect of this is to force the sleeve bore chamfer 14 against the nosepiece conical projection 13. As the pulling force increases, the sleeve material in the region 16 around the nosepiece conical portion 13 is forced radially outwards into close contact with the surface of the hole 11. The compressive force between the shoulder 8 of the stem head and the nosepiece increases, causing the material in zone 17 of the sleeve (around the portions 3 and 6 of the stem) to expand to fill the hole in this region. As the load further increases, the sleeve material in zone 17 is pressed hard against the surface of the hole into close engagement. Up to this point the abutment of the sleeve material against shoulder 8 is sufficient to sustain the load.

Figure 4:
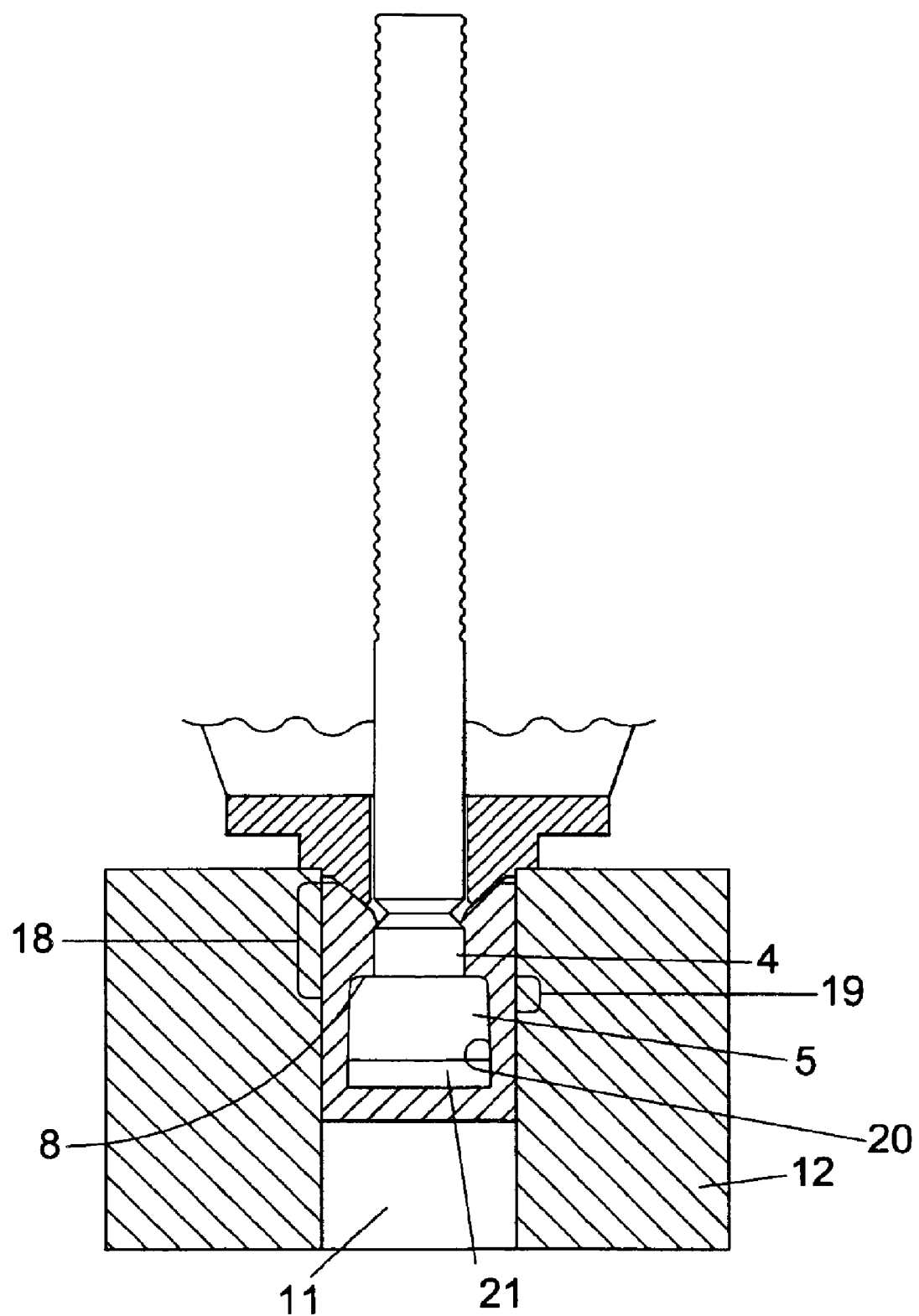
Figure 5:
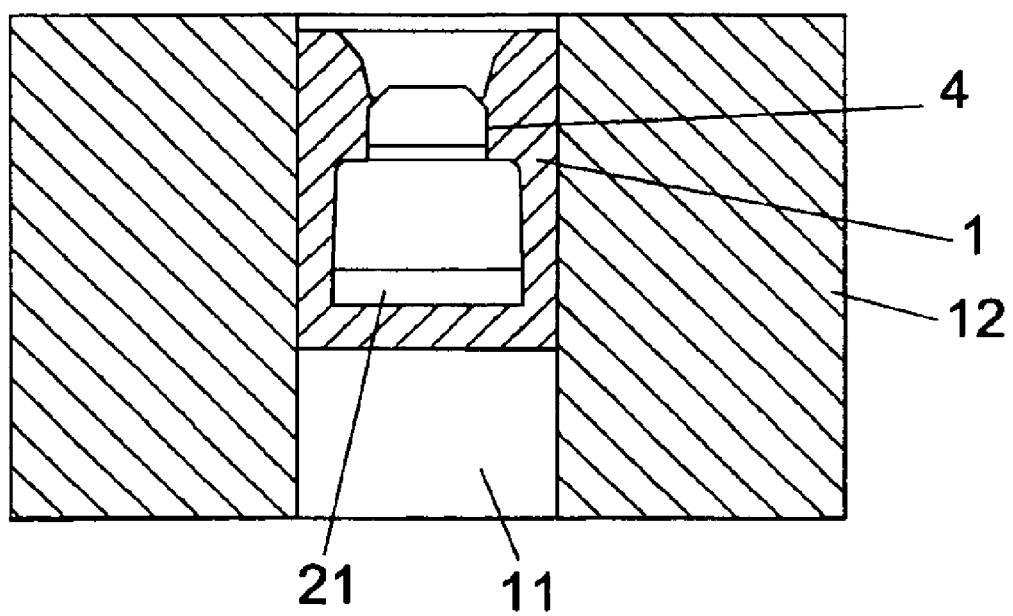

Referring to FIG. 4, as the installation tool applies even greater force to the stem, the abutment face of the sleeve begins to plastically yield under the pressure of the shoulder 8. This creates an even greater radial pressure between the sleeve and the hole in region 18 around the upper half of the sleeve 1. The increasing pulling load causes the head 4 to move forward relative to the sleeve, leaving a cavity 21 behind it. The enlarged portion 5 of the stem head has a conical surface 20, and as this is drawn into the zone 18 of the sleeve 1 adjacent its open end, the conical form 20 has the effect of creating a substantial increase in the surface pressure between the sleeve and the hole 11 in zone 19 adjacent the leading end of head enlarged part 5. As the installation tool continues to apply a pulling load to the stem, the load increases to the point where the breakneck 3 on the stem fractures. The tool with nosepiece 10, with the tool jaws holding the stem pulling portion 7, are removed from the workpiece, leaving the stem head portion 4 securely retained in the installed plug, as shown in FIG. 5.

Compared to other sealing plugs referred to earlier, a relatively small amount of axial movement of the stem is sufficient to create an effective seal between the plug and the hole. The extent of the stem movement can be gauged from the length of the remaining cavity 21 in the sleeve (FIG. 5). Because the stem head portion 4 is securely retained within the installed plug, any radial relaxation of the sleeve is to a large extent prevented, thus the high radial pressures between the sleeve and the hole which are generated during the installation operation of the plug are retained in the installed plug to a greater extent than if the stem head were not retained in the installed plug.

FIGS. 6 and 7 show a possible modification of the design of the stem head. In this case the stem head portion 6 is provided with an annular groove 22 adjacent the shoulder 8. The purpose of the groove 22 is to allow sleeve material to flow into it as the stem is drawn into the sleeve, creating a ring of material 23 which assists in the retention of the stem within the sleeve on the installed plug. Alternatively, a similar effect could be produced by having a reverse taper 24 on the head portion 6, instead of a groove as shown in FIG. 8.

The sealing plug of the foregoing example will provide enhanced strength of sealing. For example, a plug designed to seal a hole of 8 mm diameter will, when properly installed, resist a pressure of about 600 bar.

The invention is not restricted to the details of the foregoing example and possible modifications.

What is claimed is:

1. A sealing plug for blind installation in a suitable hole thereby to plug and seal the hole, which sealing plug comprises:

a sleeve having one end closed;

a stem having a head at least part of which is radially enlarged with respect to the remainder of the stem;

the stem head being within the sleeve and the stem protruding from the open end of the sleeve by passing through a part of the sleeve which has an internal cross-sectional dimension less than that of the stem head;

the stem head having a shoulder, and there being an abutment of sleeve material against at least the radially outer part of the shoulder;

the stem head being of a material which is harder than that of the sleeve and being formed with a weakened portion at a position intermediate the head and the part of the stem remote therefrom;

whereby, when the sealing plug is inserted in a suitable hole, with the sleeve entirely within the hole, and increasing tension force is applied to the stem with respect to the sleeve, axial compression is applied by the shoulder to the sleeve material abutting it, thereby causing the sleeve to deform and expand radially to engage with the hole, and thereafter the stem breaks at the weakened portion so that the head remains within the sleeve said head is provided with a locking portion of reduced cross-sectional dimension, whereby, when the sleeve is deformed as aforesaid, material of the sleeve at least partially enters the locking portion to assist in locking the head into the deformed sleeve.

2. A sealing plug as claimed in 1, in which the stem head is tapered, thereby to assist in the radial expansion of the adjacent part of the sleeve.

3. A sealing plug as claimed in claim 1, in which the open end of the sleeve is provided with an internal chamfer.

4. A sealing plug as claimed in claim 3, in which the internal chamfer of the sleeve cooperates with a conical projection on a nosepiece of the installation tool as increasing tension force is applied to the stem with respect to the sleeve to create radial expansion of the plug in the region near the open end of the sleeve.

5. A sealing plug as claimed in claim 1, in which the locking portion is provided by an annular groove.

6. A sealing plug as claimed in claim 1, in which the locking portion is provided by a reverse taper on part of the head.

* * * * *